Dec. 3, 1935. H. H. FEBREY 2,023,317

RAIL BOND

Filed July 11, 1931

INVENTOR
Harold H. Febrey
BY
ATTORNEYS

Patented Dec. 3, 1935

2,023,317

UNITED STATES PATENT OFFICE 2,023,317

RAIL BOND

Harold H. Febrey, South Orange, N. J.

Application July 11, 1931, Serial No. 550,226

4 Claims. (Cl. 173—278)

This invention relates to rail bonds and more particularly to welded rail bond assemblies of the type disclosed and claimed in my copending applications, Serial No. 134,454 filed September 9, 1926, and Serial No. 137,457 filed September 24, 1926, each entitled "Rail bonds."

Briefly, the rail bond product of my copending application comprises a terminal and at least one flexible conductor buttwelded thereto; the buttweld union being made to the terminal at a face thereof remote from the face to be attached to the rail face. The welded end of the conductor is enclosed in a sleeve member which also is welded with the conductor to the face of the terminal. The present application is in part a continuation of the above identified applications and is in part directed to certain improvements therein.

One of the objects of the present invention is to provide an improved rail bond product.

Another object of the present invention is to provide an improved method of uniting the flexible conductor to the terminal.

Another object is to facilitate manufacture of rail bonds.

Other objects and advantages will be apparent as the invention is more fully disclosed.

In accordance with the objects of the present invention, manufacture of rail bonds is materially facilitated and the rail bond product materially improved by uniting the butt end of the flexible conductor to a face of the solid terminal by welding the same thereto by means of an electric welding operation of the electric resistance type. Prior to welding the butt end of the conductor to the terminal I enclose the said end in a sleeve member and weld the butt end of the sleeve member to the terminal simultaneously with the butt end of the conductor. Preferably also the sleeve member is comprised of metal of substantially the same composition as the metal of the terminal. As the flexible conductor is usually comprised of a cuprous metal and the terminal is usually comprised of a ferrous metal, I preferably also provide on the sleeve member a coating of a metal such as zinc, aluminum or tin which serves a dual purpose in the present invention as will be more fully hereinafter disclosed.

Before further disclosing the nature and scope of the present invention reference should be made to the accompanying drawing wherein.

Figure 1:
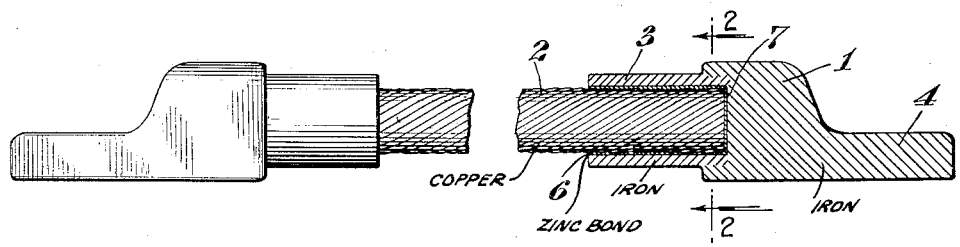
Fig. 1 is a side elevational view partly in section of a typical rail bond assembly incorporating the present invention.

Referring to Fig. 1 the rail bond assembly illustrated comprises a terminal 1, at least one flexible conductor 2, and a sleeve member 3. The sleeve member 3 encloses the end of the conductor 2 and the ends of the flexible conductor 2 and the sleeve 3 are buttwelded to a face of the terminal 1. Terminal 1 preferably but not necessarily is comprised of a base portion identified by numeral 1 to the face of which the conductor 2 is welded and a shelf portion identified by numeral 4. In the forming of the rail bond the welding method may be briefly described as follows; the end of the flexible conductor 2 is enclosed by sleeve 3 and the sleeve is then gripped by a welding electrode. Terminal 1 is gripped by a second electrode of opposite polarity and the two parts are butted to each other. Thereafter an electric current is passed through the abutting parts and the abutting surfaces incandesced to a welding temperature. The parts are then pressed together to complete the weld union. Preferably the type of welding process employed is what is known in the art as a flash weld. In such a welding process the abutting parts are separated for a brief interval of time and a relatively high temperature is created therebetween by means of an electric arc sufficient at least to effect a vaporization of some of the metal comprising the same. Thereafter the two surfaces are brought together with pressure to complete the weld.

In the preferred rail bond assembly terminal 1 is comprised of a ferrous alloy such as soft low carbon steel, and conductor 2 is comprised at least in major part of stranded copper wires. Sleeve 3 is also preferably comprised of a ferrous alloy of the same composition as that comprising terminal 1. It is well known that copper does not readily alloy with iron and it is exceedingly difficult to weld copper to iron. In the flash weld union of the conductor to terminal in accordance with the process disclosed in my prior applications, it has been customary to rely upon the strength obtained by a relatively thin homogeneous admixture of melted copper and iron at the welded end of the conductor 2. The close gripping mechanical support of sleeve member 3 has been utilized to improve the strength of the assembly.

I have found, however, that by surfacing at least the interior of the sleeve member with a highly reactive metal, such as zinc and aluminum and preferably surfacing with a metal such as zinc or tin which readily alloys with the metal comprising both the conductor and the sleeve, the strength of the weld union is markedly increased. Certain other advantages also are obtained.

As a specific embodiment of the present invention sleeve member 3 is preferably coated with zinc. This may be done in any convenient manner such as by dipping, spraying, electrical deposition or by the well known zinc sheridizing process. It is preferred, however, to apply the zinc coating to the sleeve member by the well known dipping or galvanizing process, as in this method the ferrous metal base upon which the zinc is coated is substantially freed from surface impurities such as oxides, greases and the like prior to the application of the zinc coating thereto. This is particularly desirable in the present invention.

Figure 4:
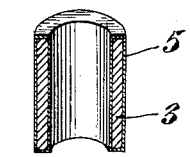
Fig. 4 is a sectional view of a sleeve member.

Fig. 4 illustrates the sleeve member of the present invention surfaced with a zinc coating 5. This sleeve member is thereafter applied to the end of the conductor 2 in the manner as disclosed in my above identified copending applications and the welding process above set forth applied thereto in the forming of rail bond.

Figure 2:
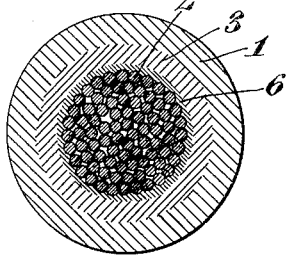
Fig. 2 is a cross-sectional view of the same taken along plane 2—2 Fig. 1.
Figure 3:
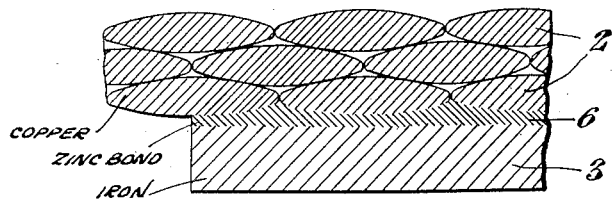
Fig. 3 is an enlarged sectional view illustrating the present invention.
Figure 5:
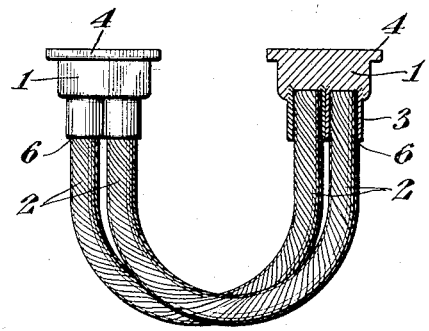
Fig. 5 illustrates a second modification or type of rail bond to which the present invention may be applied.

It is found that the zinc coating 5 upon the sleeve member 3 forms an intimate alloy bond between the iron alloy comprising the sleeve and the surface of the conductor 2. This alloy bond is illustrated in Figs. 1, 2 and 3 and identified by numeral 6. In addition it is found that the zinc tends to enter the heretofore identified homogeneous admixture of copper and iron at the end 7 of the conductor 2 forming therewith an intermetallic alloy admixture which is more firmly bonded to the terminal 1 and to the conductor 2 than the homogeneous metallic admixture heretofore obtained. These two features and advantages materially strengthen the weld union of conductor to terminal.

In addition, another advantage is obtained by reason of the fact that the zinc coating upon the exterior of the sleeve member is in major part vaporized by the heat of the welding operation, and tends to envelop the welding electrodes to such an extent that they are protected from surface oxidation and deterioration during the welding operation thus materially increasing the operating life thereof.

It is believed apparent that there may be many modifications and departures made from the specific embodiment herein disclosed, but such modifications and departures are contemplated as may fall within the scope of the following claims.

What is claimed:

1. A rail bond comprising a pair of terminals adapted to be united to rails, at least one flexible conductor interconnecting said terminals and a sleeve member at least interiorly surfaced with zinc enclosing each end of said conductor, the butt end faces only of said conductor and sleeve member being united to the body of said terminals.

2. A rail bond comprising a pair of terminals adapted to be united to rails, at least one flexible conductor interconnecting the said terminals, a sleeve member enclosing each end of said conductor, a layer of zinc interposed between the said conductor and the said sleeve member, the butt end faces only of said conductor and sleeve member being united to the body of said terminals.

3. A rail bond comprising a pair of terminals composed of a ferrous alloy, at least one flexible conductor composed of cuprous metal interconnecting the said terminals, a sleeve member composed of a ferrous alloy enclosing each end of said conductor, a layer of zinc interposed between the said conductor and the said sleeve member, the butt end faces only of said conductor and said sleeve member being united to the body of said terminals.

4. In a rail bond comprising a pair of terminals and at least one flexible conductor interconnecting the terminals, a sleeve member interiorly surfaced with zinc enclosing each end of said conductor and the butt end faces only of the said conductor and sleeve member being united to the said terminals.

HAROLD H. FEBREY.